United States Patent [19]

Thompson

[11] 3,744,313

[45] July 10, 1973

[54] FLUID FLOW METERING DEVICE
[75] Inventor: Frank R. Thompson, Cranston, R.I.
[73] Assignee: Taco, Inc., Cranston, R.I.
[22] Filed: Sept. 21, 1970
[21] Appl. No.: 73,900

[52] U.S. Cl. .................................. 73/208, 137/315
[51] Int. Cl. ............................................ G01f 1/00
[58] Field of Search ...................... 73/207, 208, 209, 73/419; 137/315; 116/117

[56] References Cited
UNITED STATES PATENTS

| 3,415,119 | 12/1968 | Moore | 73/208 |
| 2,210,081 | 8/1940 | Humphrey | 73/208 |
| 1,450,611 | 4/1923 | Schroeder | 73/208 |
| 1,565,866 | 12/1925 | Schroeder | 73/208 X |
| 1,855,044 | 4/1932 | Conrader | 73/208 |
| 1,038,803 | 9/1912 | Vaughan | 73/208 |
| 2,400,108 | 5/1946 | Elowson | 73/208 |

FOREIGN PATENTS OR APPLICATIONS

| 572,095 | 2/1933 | Germany | 73/208 |

Primary Examiner—James J. Gill
Assistant Examiner—Arthur E. Korkosz
Attorney—Lane, Aitken, Dunner & Ziems

[57] ABSTRACT

A device for metering fluid flow, including a casing adapted for connection to a conduit and having a chamber registering with said conduit, and a plunger movable in the chamber in proportion to the amount of fluid flow through the chamber for giving an indication of the fluid flow. A valve is provided in the chamber for regulating the amount of fluid flow.

8 Claims, 5 Drawing Figures

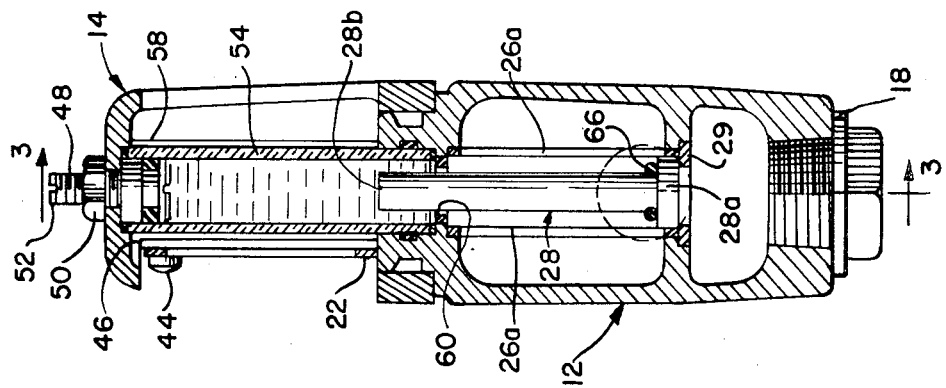
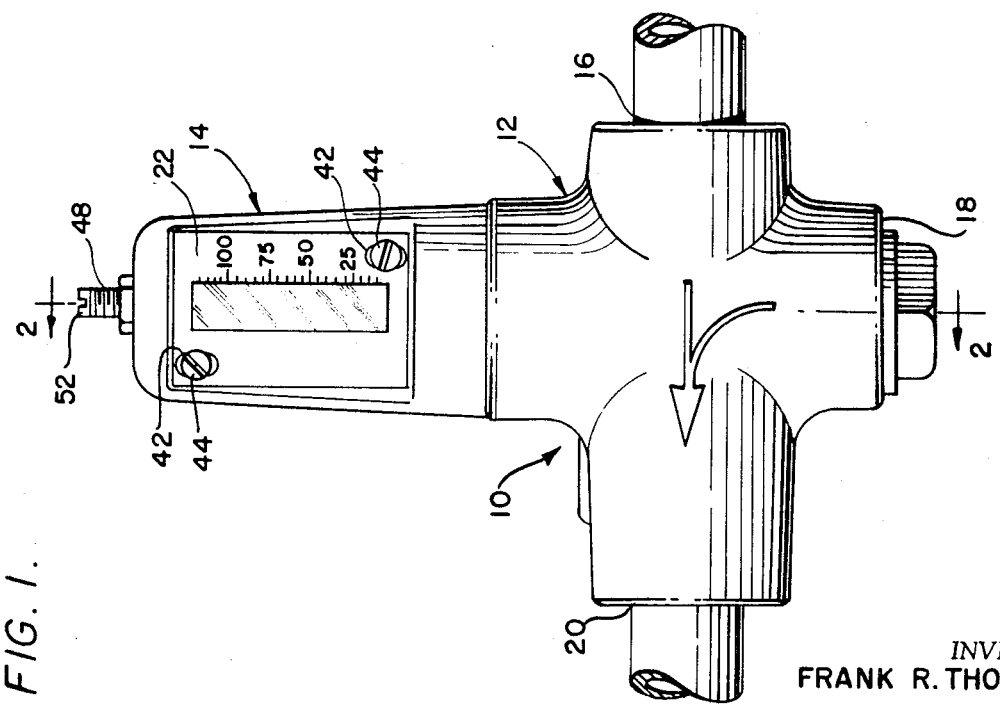

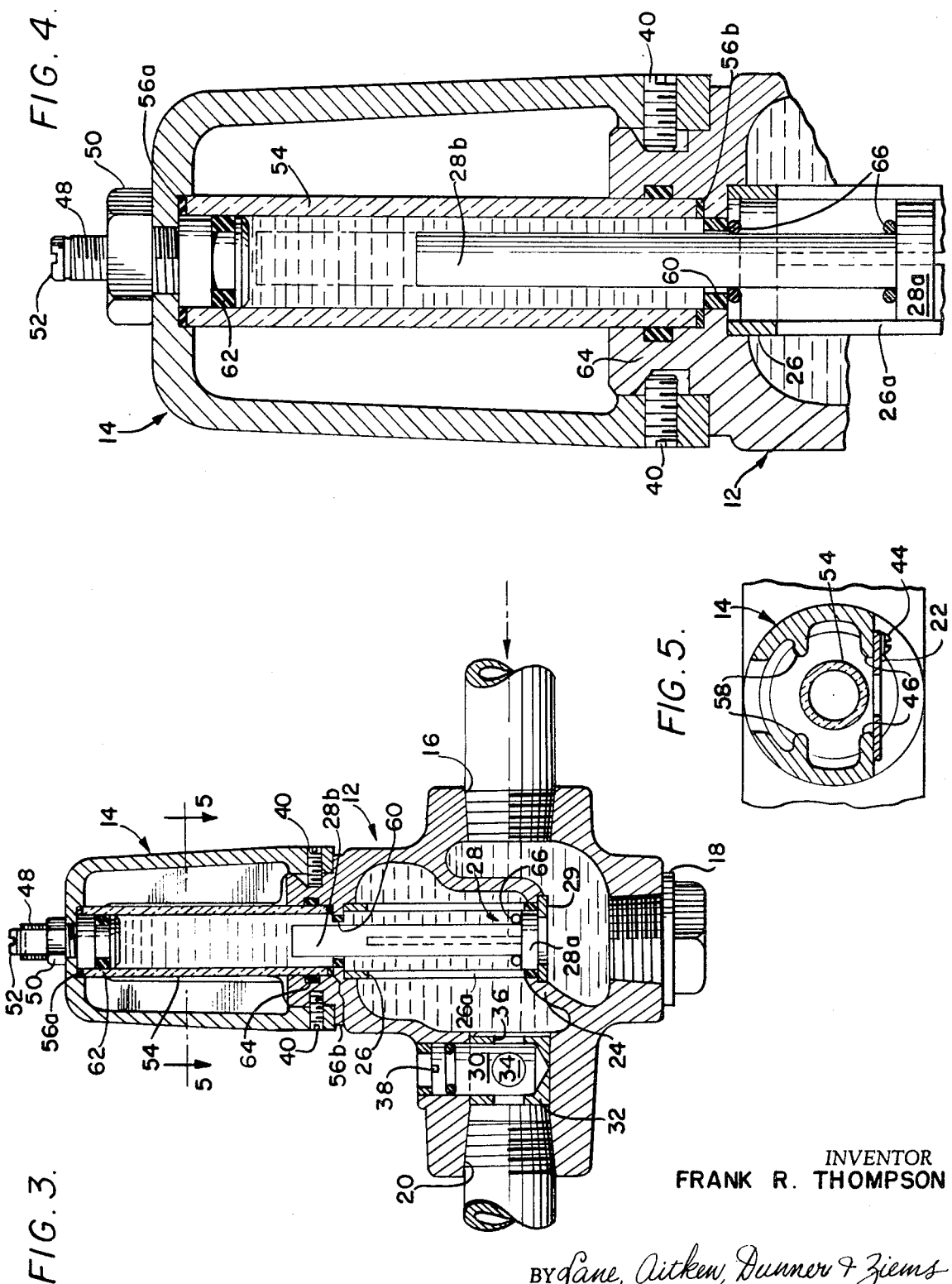

FLUID FLOW METERING DEVICE

BACKGROUND OF THE INVENTION

This invention relates to a metering device and, more particularly, to a device for controlling and measuring fluid flow through a conduit.

Although many types of devices have been proposed for controlling and measuring fluid flow through a conduit, many suffer from one or more of several defects, especially in systems utilizing relatively small pipe sizes. For example, the prior art devices often do not provide a linear readout, and are susceptible to calibration and temperature errors as well as mechanical wear. They are also sensitive to turbulence caused by any fittings or valves immediately upstream or downstream of the device, and are susceptible to line pulsations which render their readouts relatively unstable. Also, they are not easily adaptable to systems having unusual line configurations, and are often difficult to read.

Units which eliminate one or more of these defects are usually so high in cost that they are prohibitive to high volume use, and this often limits the number that can be used in a relatively large system.

SUMMARY OF THE INVENTION

It is therefore an object of the present invention to provide a fluid flow metering device which provides a stabilized linear readout and which minimizes calibration and temperature errors.

It is a further object of the present invention to provide a device of the above type which is insensitive to turbulence caused by any fittings or valves immediately upstream or downstream of the device.

It is a still further object of the present invention to provide a device of the above type which can be adjusted to a variety of conduit configurations, and yet can be easily read.

It is a still further object of the present invention to provide a device which incorporates the above advantages, yet is relatively inexpensive in cost.

Toward the fulfillment of the above objects, the device of the present invention comprises a casing adapted for connection to a fluid flow conduit and having a chamber registering with said conduit, a slotted tube disposed in said chamber in the flow path of the fluid, a plunger mounted in said tube for slidable movement in response to fluid flow through said chamber, means responsive to said slidable movement for providing an indication of fluid flow, and means in said chamber for varying the amount of said fluid flow.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings:

FIG. 1 is a front elevational view of the control and measuring device of the present invention shown connected in a fluid flow system;

FIG. 2 is a cross-sectional view taken along the line 2—2 of FIG. 1;

FIG. 3 is a cross-sectional view taken along the line 3—3 of FIG. 2;

FIG. 4 is an enlarged partial view of FIG. 3, but showing the plunger portion of the device in two operable positions; and FIG. 5 is a cross-sectional view taken along the line 5—5 of FIG. 3.

DESCRIPTION OF THE PREFERRED EMBODIMENTS

Referring specifically to the drawings, the metering device of the present invention is shown in general by the reference numeral 10, and consists of a casing 12 having a cover 14 attached thereto. The casing 12 is in the general form of a globe valve casing having a pair of inlet orifices 16 and 18 and an outlet orifice 20, with the inlet orifice 18 being shown plugged for the purposes of example. An indicia plate 22 is affixed to the front portion of the cover as viewed in FIG. 1, and includes indicia for providing an indication of fluid flow, as will be described in detail later.

As shown in FIGS. 2 and 3, a partition 24 extends across the casing 12 and has an opening therein which registers with a tube 26 having four elongated slots 26a formed therethrough. A plunger 28 moves axially in the tube 26 and comprises a piston portion 28a extending in a closely spaced relation to the inner walls of the tube, and a stem portion 28b integral with the piston portion. A stop 29 is provided in the opening in the partition 24, and receives an end of the tube 26 as well as the lower face of the piston portion 28a of the plunger 28 in the lowermost portion of the latter, as viewed in FIGS. 2 and 3.

A valve core 30 is disposed in a cage 32 mounted in the casing 12 adjacent the outlet orifice 20. A through opening 34 is formed through the valve core 30 which is adapted to register with a pair of aligned openings 36 provided in the cage 32 to permit the passage of fluid through the openings. The head of the valve core 30 has a slot 38 for engagement by a screwdriver, or the like, for rotating the valve core within the cage 32 to vary the degree of registration of the openings 34 and 36, and thus control the rate of fluid flow through the casing 12.

The cover 14 is attached to the upper portion of the casing 12 by means of a pair of set screws 40 engaging in a continuous channel formed in the outer surface of the casing which permits the cover, and therefore the indicia plate 22, to be secured in any angular position relative to the direction of fluid flow through the casing.

As shown in FIG. 1, the indicia plate 22 has a pair of elongated slots 42 formed therethrough which receive mounting bolts 44. Referring to FIGS. 2 and 5, a pair of webs 46 are formed in the front portion of the cover 14 and have a pair of apertures extending therethrough which register with the slots 42, with the mounting bolts 44 extending through these slots and apertures to secure the indicia plate 22 relative to the cover 14, while permitting a slight axial adjustment therebetween.

A vent plug 48 is threaded through an opening formed in the upper portion of the cover 14 with a portion of the plug extending within the cover 14. The plug 48 is secured relative to the cover by means of a lock nut 50, and a screw 52 is threadably mounted in a bore formed through the plug 48. The specific details of the plug 48 and its associated components are set forth in a patent application Ser. No. 74,043 entitled "Vent for Flow Metering Device," filed concurrently herewith by Leonard Piette and assigned to the same assignee as the present application; it being sufficient for the purposes of the present application to note that axial movement of the screw 52 outwardly from the plug 48 will connect the interior of the cover 14 to atmosphere.

A cylindrical sight glass 54 is mounted between a pair of cushions 56a and 56b within the cover 14 and is framed by the indicia plate 22 relative to the front portion of the device. As shown in FIG. 5, the front portion of the sight glass 54 is exposed to the exterior through the slot in the indicia plate 22 and the space between the pair of webs 46, and a diametrically opposite portion of the sight glass is exposed to the exterior through the space between an additional pair of webs 58 located in the rear portion of the cover 14. The diametrically opposed spaces between the front webs 46 and the rear webs 58 permit light to be directed straight through the sight glass 54 and achieve a better readout, as will be apparent from the following.

A chamber is defined within the sight glass 54 and receives the stem portion 28b of the plunger 28, with the stem portion extending through an annular bushing 60 disposed in a shoulder provided in the top portion of the casing 12. A clearance is provided between the inner wall of the bushing 60 and the stem portion 28b of the plunger 28 to permit fluid leakage upwardly from the tube 28 into the chamber defined within the sight glass 54. A pair of annular seals 62 and 64 are provided between the sight glass 54 and the end portion of the plug 48, and between the sight glass and an inner wall formed in the upper portion of the casing 12, respectively, to prevent fluid leakage outwardly from the chamber defined within the sight glass 54.

An O-ring seal 66 is disposed immediately above the piston portion 28a of the plunger 28 and is adapted to engage the bushing 60 upon the plunger attaining its uppermost position.

In operation, and assuming it is desired to meter fluid flow in a system having a straight line conduit configuration at the desired metering point, the orifice 18 is plugged as shown, and the orifices 16 and 20 are respectively connected to two conduits in the system, as shown. The valve core 30 is rotated to regulate the flow of fluid through the casing 12, and assuming that this rotation results in an increased flow rate, a pressure differential will be created between the inside of the tube 26 and the outside thereof due to the throttling effected by the piston portion 28b cooperating with the elongated slots 26a formed in the tube to define a series of restricted openings for passage of the fluid. As a result of the pressure differential, the plunger 28 moves upwardly against its own weight and exposes more slot, thus dropping the pressure differential. This movement continues until the pressure is balanced, causing the plunger 28 to come to a rest position between the ends of the tube 26, as shown by the solid lines in FIG. 4. This upward movement of the plunger will result in the end of the stem portion 28b of the plunger 28 moving upwardly in the sight glass 54 relative to the indicia scale on the plate 22. The length of the scale is proportional to the weight of the plunger 28, the width and length of the slots 26a, and the diameter of the tube 26, and may be calibrated in terms of flow rate, such as gallons per minute.

During the above operation, some of the fluid will pass around the piston portion 28a of the plunger 28, upwardly in the tube 26, through the clearance provided between the bushing 60 and the stem portion 28b of the plunger, and into the chamber defined within the sight glass 54. This creates a damping effect on the upward movement of the plunger 28 which smooths out line pulsations and stabilizes the readout.

As a result of the above arrangement, an operator can simply rotate the valve core 30 while directly reading the amount of flow through the system, which enables him to adjust the flow to a predetermined rate.

When it is desired to remove the cover 14 for the purposes of cleaning the sight glass 54, etc., the two set screws 40 are loosened until the cover pops up and exposes the chamber defined within the sight glass 54 to atmospheric presusre. As a result, the plunger 28 moves to its uppermost position, as shown by the dotted lines in FIG. 4, whereby the O-ring seal 66 engages the bushing 60 to prevent any further flow of fluid upwardly beyond the bushing. Then the cover 14 can simply be removed without any danger of leakage.

There are advantages of the metering device of the present invention in addition to those apparent from the foregoing. For example, the inlet orifice 16 can be plugged and the outlet orifice 18 connected in a fluid flow system in the event there is a perpendicular alignment between the respective conduits. Also, after installation of the device, the cover 14, and therefore the indicia plate 22, can be rotated relative to the casing 12 to permit viewing of the stem portion 28b of the plunger 28 from any angle relative to the fluid flow pattern through the casing.

The provision of the sealing of the chamber defined by the sight glass 54 permits cleaning of the glass without the need to shut off the system. Further, the sight glass 54 does not have to be manufactured to a close tolerance due to the presence of cushions 56a and 56b, thus effecting a significant cost saving. Since the plunger positions itself to maintain a constant pressure drop across the slots 26a, the velocity at high rates of flow is nearly the same as that at low rates of flow, which reduces the effect of Reynolds number to a minimum. Further, a direct linear readout is provided which is directly proportional to the amount of flow thereof, eliminating the need for conversion tables or the like.

The device of the present invention is also insensitive to turbulence caused by fittings or valves immediately upstream or downstream of the device, and minimizes calibration and temperature errors, due to the elimination of springs and the like. Also, the use of a sharp-edged float reduces the effect of viscosity to a minimum.

Of course, variations of the specific construction and arrangement of the device disclosed above can be made by those skilled in the art without departing from the invention as defined in the appended claims.

I claim:

1. A device for metering fluid flow through a conduit, comprising a casing adapted for connection to said conduit and having a flow chamber registering with said conduit, means responsive to fluid flow through said flow chamber for moving in proportion to the amount of fluid flow through said chamber, a cover extending over said casing and defining at least a portion of a damping chamber registering with said flow chamber, said damping chamber adapted to receive a portion of said fluid, a portion of said moving means adapted to move in said damping chamber, and means for preventing fluid flow from said flow chamber to said damping chamber upon removal of said cover.

2. The device of claim 1 further comprising indicia means carried by said casing and cooperating with said moving means for providing an indication of said flow.

3. The device of claim 1 wherein a static fluid pressure is created in said damping chamber which opposes the movement of said moving means.

4. The device of claim 3 further comprising means to vent said damping chamber and relieve said static fluid pressure, and means responsive to said venting for preventing fluid flow from said flow chamber to said damping chamber.

5. The device of claim 1 further comprising means to regulate the amount of fluid flow through said flow chamber.

6. A flowmeter comprising a casing adapted for connection to a conduit and having a flow chamber registering with said conduit, means responsive to fluid flow through said flow chamber for moving in proportion to the amount of flow through said chamber, and cover means for said casing, said cover means defining a passage registering with said flow chamber for receiving said moving means, and means to seal said chamber automatically upon removal of said cover means from said casing.

7. The flowmeter of claim 6 wherein said means to seal said chamber comprises said moving means.

8. The flowmeter of claim 6 wherein said cover includes indicia means cooperating with said moving means to provide an indication of fluid flow through said chamber.

* * * * *

UNITED STATES PATENT OFFICE
CERTIFICATE OF CORRECTION

Patent No. 3,744,313  Dated July 10, 1973

Inventor(s) Frank R. Thompson

It is certified that error appears in the above-identified patent and that said Letters Patent are hereby corrected as shown below:

The term of this patent subsequent to

August 29, 1989, has been disclaimed.

Signed and Sealed this

Twelfth Day of October 1976

[SEAL]

Attest:

RUTH C. MASON  
Attesting Officer

C. MARSHALL DANN  
Commissioner of Patents and Trademarks